United States Patent [19]
Burstein

[11] 4,123,016
[45] Oct. 31, 1978

[54] CONTROL FOR MINI TAPE RECORDER

[76] Inventor: William J. Burstein, 92 Brook Ave., Deer Park, N.Y. 11729

[21] Appl. No.: 854,518

[22] Filed: Nov. 25, 1977

[51] Int. Cl.² .............................................. G03B 1/04
[52] U.S. Cl. ....................................... 242/201; 274/17
[58] Field of Search ..................... 242/198, 201-204, 242/208-210; 200/86.5; 360/72, 74; 274/1 R, 1 G, 17; 312/208

[56] References Cited

U.S. PATENT DOCUMENTS

| | | | |
|---|---|---|---|
| 1,908,737 | 5/1933 | Durand | 274/17 |
| 1,962,394 | 6/1934 | Howarth | 274/17 |
| 2,220,475 | 11/1940 | Burdick et al. | 312/208 |
| 2,664,251 | 12/1953 | Berlant | 242/202 |
| 3,206,265 | 9/1965 | Amos | 312/208 |
| 3,218,080 | 11/1965 | Best | 274/17 |
| 3,237,952 | 3/1966 | Dollenmayer | 274/17 |

*Primary Examiner*—Leonard D. Christian
*Attorney, Agent, or Firm*—James P. Malone

[57] ABSTRACT

An adapter for adapting a mini tape recorder for transcribing control by a secretary. A mount is provided for the mini tape recorder. A solenoid in the mounting means is adapted to actuate the reverse wind control. A foot control has two contacts. One contact is connected to actuate the tape recorder in the forward direction and the other contact is connected to the solenoid to actuate the rewind control.

1 Claim, 5 Drawing Figures

U.S. Patent
Oct. 31, 1978
4,123,016
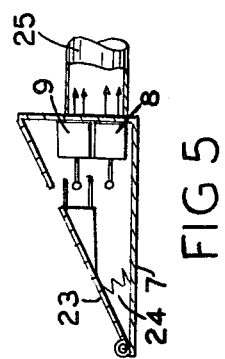
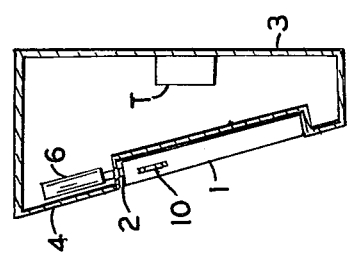
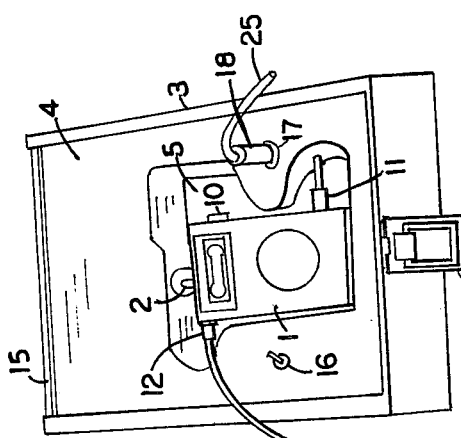
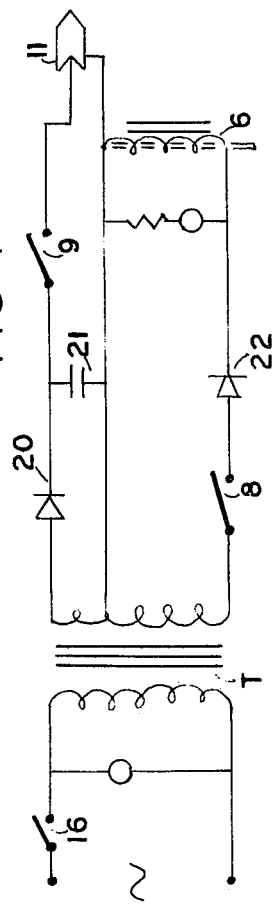
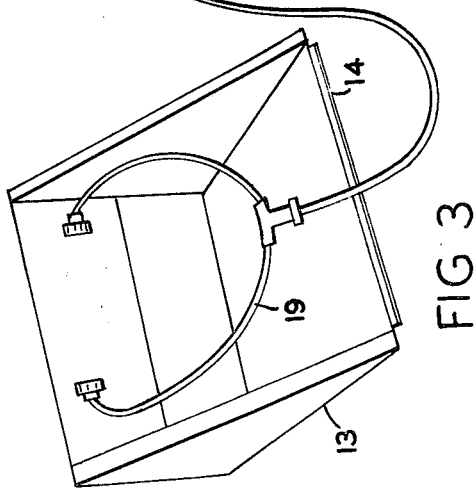

CONTROL FOR MINI TAPE RECORDER

This invention relates to recording devices and more particularly, means to mount and adapt a mini tape recorder for control by a secretary.

Mini tape recorders are hand held devices for recording and replaying audible conversations, etc. However, it is difficult or impossible for a secretary to transcribe the material on the tape because it is necessary to hold the recorder in the users hand in order to actuate the forward and reverse controls.

The present invention provides means for mounting the mini tape recorder so that the secretary can control it with a foot control so that both of her hands will be free for utilizing the typewriter.

Accordingly, the principal object of the invention is to provide new and improved transcribing means.

Another object of the invention is to provide new and improved means for adapting a mini tape recorder for control by a secretary.

Another object of the invention is to provide a new and improved means to adapt a mini tape recorder of the type having a power supply and a reverse wind control for transcribing control by a secretary comprising, means to mount the mini tape recorder, a solenoid in the mounting means adapted to actuate the reverse wind control, a foot switch having two contacts, one contact being connected to actuate the tape recorder in the forward direction, and the other contract being connected to the solenoid to actuate the rewind control to cause the tape to move in the reverse direction.

These and other objects of the invention will be apparent from the following specifications and drawings, of which:

FIG. 1 is a front perspective view of an embodiment of the invention.

FIG. 2 is a side sectional view of FIG. 1.

FIG. 3 is a perspective view of the cover.

FIG. 4 is a circuit diagram of an embodiment of the invention.

FIG. 5 is a side view of the foot control with one side removed.

In the transcribing of spoken material on the tape it is necessary for the secretary to move the tape forward and backward periodically as normal conversation is too fast to type.

Referring to the Figures, the invention provides means to mount a conventional normally hand held mini tape recorder 1, so that it can be controlled by a secretary operating a foot control 7. The conventional mini tape recorder has a rewind control button 2 and has a socket for an external power supply. The rewind button 2 reverses the tape device while it is depressed.

The mounting member 3 has a slanting front face 4, having a recess 5 adapted to receive the mini-recorder. The recess 5 is formed so as to accommodate a power plug 11 and headset plug 12 into the mini-recorder, and to provide easy access to the volume control 10 of the mini-recorder. A solenoid 6 is mounted in the mounting member 3, in position to actuate the conventional rewind button 2, which is a spring loaded button normally operated by the thumb of the person holding the recorder 1.

The front face 4 of the mounting panel has an on/off switch 16 and a socket 17 to receive the plug 18 connected to the foot switch 7.

A hollow cover 13 is provided to fit the mount 3. The cover has a projecting tongue 14 which is adapted to fit into a corresponding groove 15 in the mount 3 so that the cover 13 may be locked to the mount with the latch 16'. The cover is hollow and has sufficient space for carrying the headset 19 as well as the foot control 7, and the cover also has a carrying handle, not shown, so that the device is easily portable.

FIG. 4 shows a circuit diagram. 115 volts AC is supplied to the transformer T. The secondary of the transformer is tapped to provide two different voltages. The upper section of the transformer is connected to diode bridge 20 and capacitor 21 and then through switch 9 of foot control 7 to the plug 11 which is plugged into the mini-recorder. The outer section of the transformer secondary is connected through foot operated switch 8 and diode bridge 22 to operate the reverse solenoid 6.

FIG. 5 shows a side view of the foot control 7 with the side cover removed. The foot pedal 23 is operated by the user. When pressed down slightly, the pedal actuates switch 9 which provides 3 volts d.c. to the mini-recorder and operates the recorder in the forward direction. When pressed down further the pedal 23 also actuates the switch 8 which operates the solenoid 6 to press the reverse button of the mini-recorder. The pedal 23 is spring loaded in the upward direction by means of the spring 24.

In operation the mini tape recorder is put in the recess 5 and the connections plugged in. The secretary can then play back the recording by operating the foot control 7 as previously described.

Therefore, the present invention provides an inexpensive means for converting an expensive mini tape recorder for transcribing control. This is a very convenient arrangement since the mini-recorder can be carried in the users pocket and dictation can be made any time, for instance, when riding in the car, or in other situations where a normal tape recorder would be too bulky to carry around. For instance, a mini tape recorder can be easily used for recording notes at meetings, interviews, etc., while the interviewer is travelling around to different locations.

To place in operation, headset plug 12 and power plug 11 are plugged into the min-recorder and it is placed in the recess 5 in panel 4. The foot control 7 is connected by means of plug 17 and electrical cord 25.

It is claimed:

1. Means to adapt a mini-tape recorder of the hand held type having a reverse wind control for transcribing control by a secretary comprising, means to mount the mini-tape recorder, comprising a mounting member with a slanting front face, the front face having a recess adapted to receive the mini-tape recorder, the recess being formed so as to accommodate a power plug and head set plug inserted into the mini-tape recorder and to provide easy access to the volume control of the minitape recorder, a solenoid in the mounting means adapted to actuate the reverse wind control, foot operation switch means having two contacts, one contact being connected to actuate the tape recorder in the forward direction and the other contact being connected to the solenoid to actuate the rewind control to cause the tape to move in the reverse direction, a removable cover for the mounting means, the cover being adapted to accommodate a head set and foot control.

* * * * *